(No Model.) 4 Sheets—Sheet 1.

F. F. RAYMOND, 2d.
NAIL MAKING AND DISTRIBUTING MACHINE.

No. 380,818. Patented Apr. 10, 1888.

WITNESSES.

INVENTOR.

(No Model.) 4 Sheets—Sheet 2.
F. F. RAYMOND, 2d.
NAIL MAKING AND DISTRIBUTING MACHINE.
No. 380,818. Patented Apr. 10, 1888.
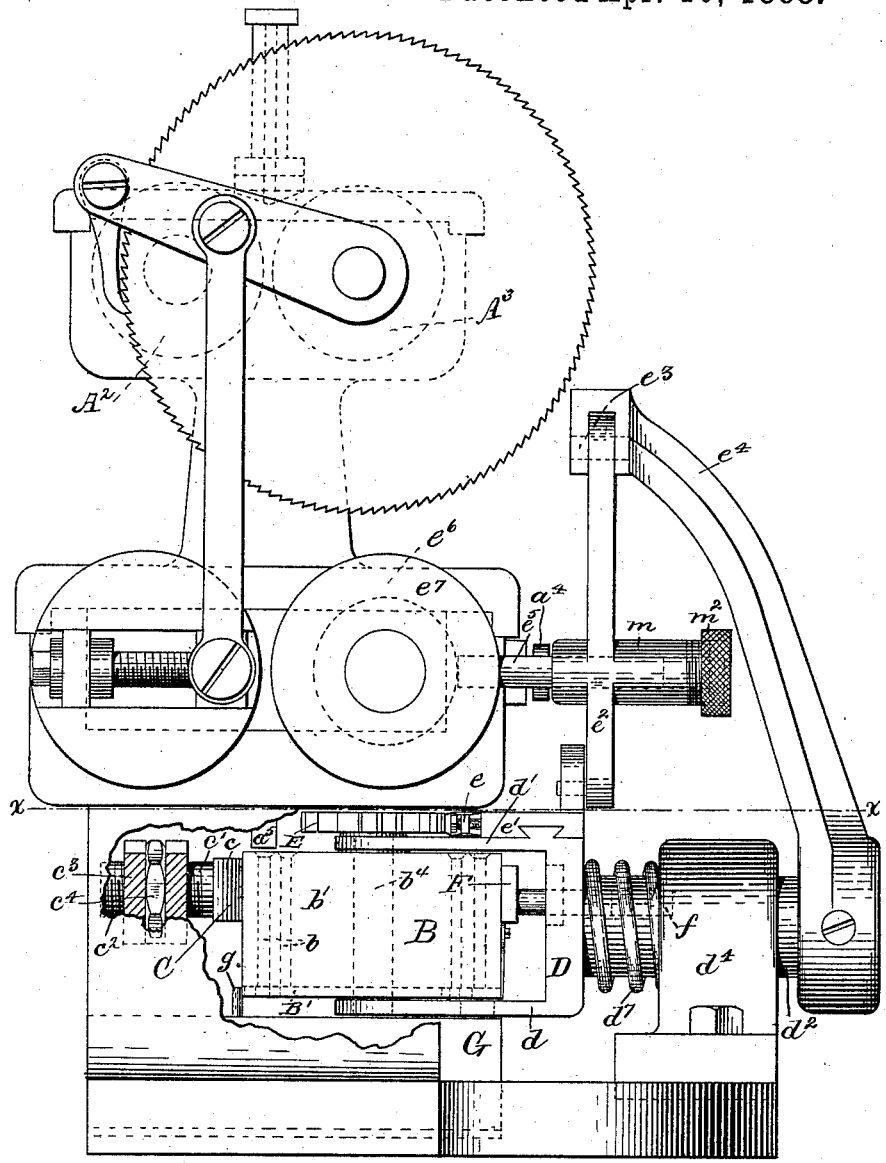
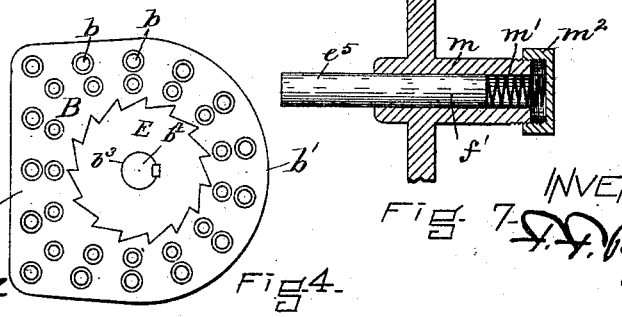
WITNESSES.
J. N. Dolan.
E. P. Small.
INVENTOR.
F. F. Raymond (No Model.)
F. F. RAYMOND, 2d.
NAIL MAKING AND DISTRIBUTING MACHINE.
No. 380,818. Patented Apr. 10, 1888.
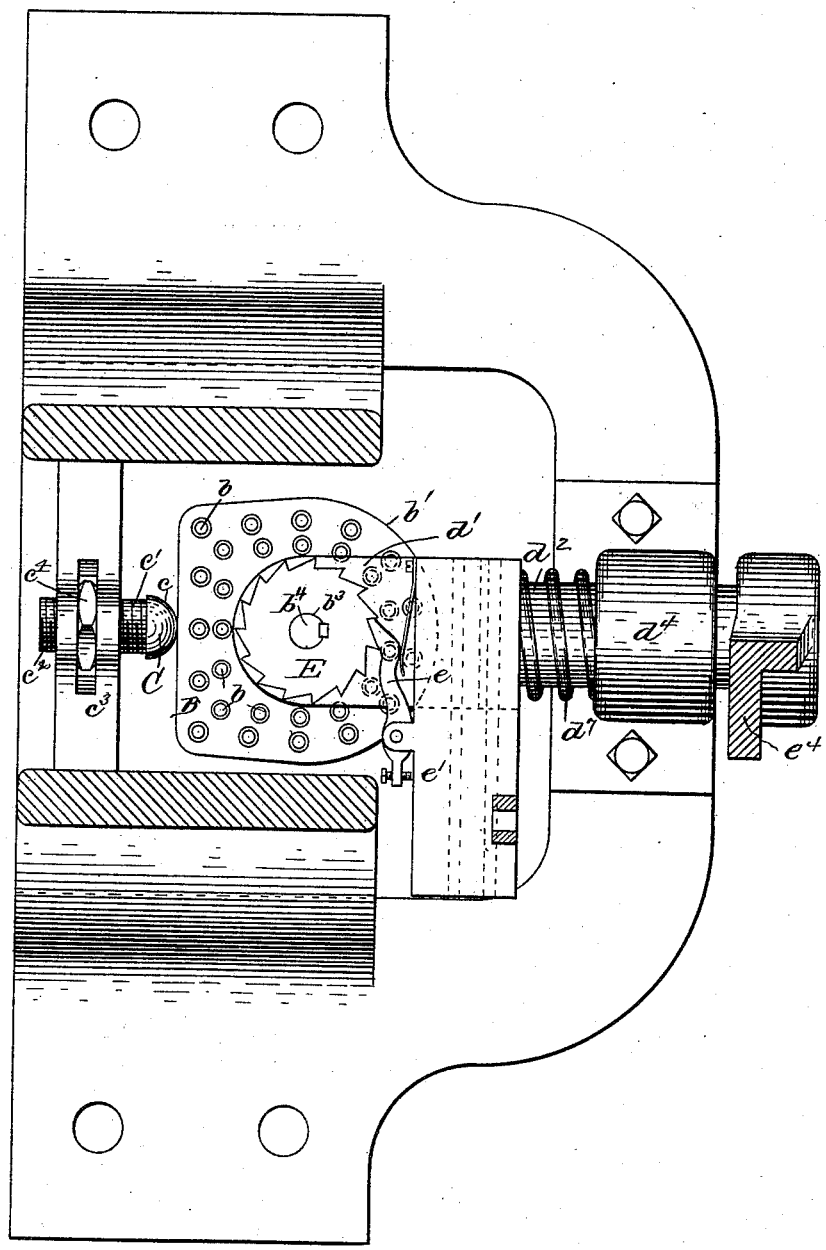
WITNESSES. Fig. 3. INVENTOR.

(No Model.) 4 Sheets—Sheet 4.
F. F. RAYMOND, 2d.
NAIL MAKING AND DISTRIBUTING MACHINE.
No. 380,818. Patented Apr. 10, 1888.

WITNESSES
J. M. Dolan.
E. P. Small.

INVENTOR
F. F. Raymond

United States Patent Office.

FREEBORN F. RAYMOND, 2D, OF NEWTON, MASSACHUSETTS.

NAIL MAKING AND DISTRIBUTING MACHINE.

SPECIFICATION forming part of Letters Patent No. 380,818, dated April 10, 1888.

Application filed October 27, 1887. Serial No. 253,483. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nail Making and Distributing Machines, of which the following is a full, clear, and exact description, reference being had to the accompanying drawings, forming a part of this specification, in explaining its nature.

The invention is an improvement upon that described in the application of Chester C. Small, filed April 21, 1887, Serial No. 235,648, and upon that described in my application for Letters Patent of even date herewith. It comprises a pattern-block having a series of nail-receiving holes formed therein, preferably of the arrangement in which it is desired that they shall be driven, and means for guiding and rotating said pattern-block so that each nail-receiving hole is brought in line in successive order with a throat or passage through which the nails are delivered to it, or from which they leave the nail making or distributing machine.

The invention further relates to the combination, in an organized machine, of a nail receiving and distributing pattern-block of this character with mechanism for making nails or delivering nails through a common throat or passage in successive order.

It further relates to the combination of a rotary pattern or distributing block and a nail-carrier.

It further relates to various features of organization and construction, all of which will hereinafter be described.

Figure 1:
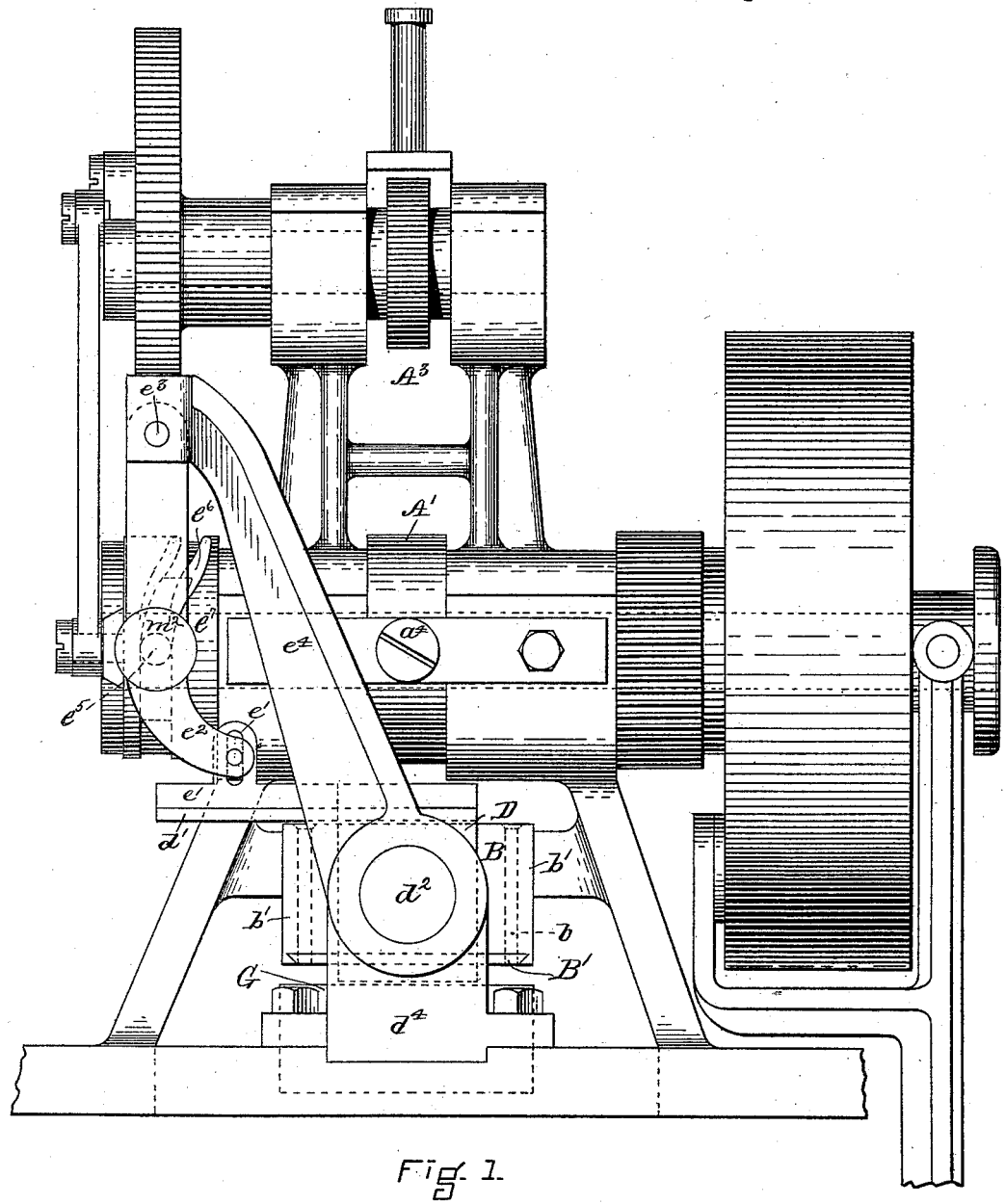
Figure 5:
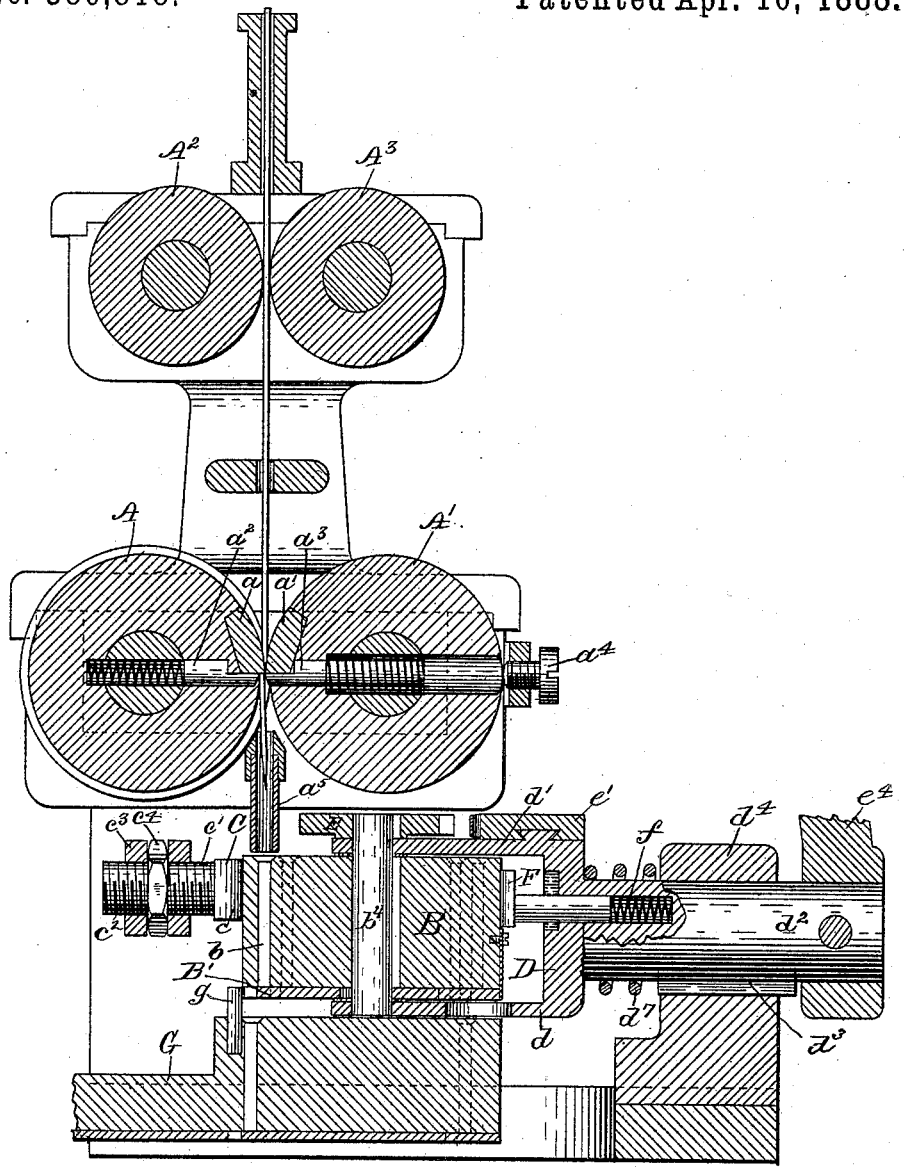
Figure 6:
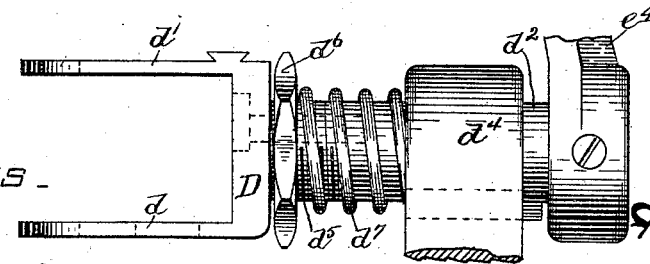

In the drawings, Figure 1 is a rear elevation of the machine. Fig. 2 is a side elevation, a portion of the frame being broken out to show the construction beyond. Fig. 3 is a view in horizontal section and plan below the dotted line $x\ x$ of Fig. 2. Fig. 4 is a plan view of the distributing-block B, and the ratchet-wheel carried thereby. Fig. 5 is a vertical central section of the machine. Fig. 6 is a view in elevation of a slight modification. Fig. 7 is a detail view representing the manner of moving the feed-lever in relation to its operating cam-pin.

In the drawings I have represented the invention as embodied in a machine having nail-making devices similar to those described in the said Small application, and they comprise, briefly, the rolls A A', having point-drawing dies $a\ a'$ and nail-severing cutters $a^2\ a^3$, the wire-feed roll $A^2\ A^3$, and a cam, $a^4$, for operating the nail-cutters, operative mechanism for rotating the rolls and for imparting an intermittent rotary movement to the feed-rolls, and the throat $a^5$, through which nails are delivered from the throat. This throat may also have a clearer to traverse it, such as described in my said application of even date.

I would here say that I do not confine myself to this especial form of nail-making machine, as the distributer is adapted to be used in combination with any nail-making or nail-delivering maching having a throat or passage through which nails are delivered in successive order.

B is the distributing-block. It has the nail-receiving holes $b$ formed therein, preferably in the line or arrangement in which the nails are to be driven, and in the drawings I have represented the distributing-block as shaped and provided with the holes necessary for receiving, arranging, and delivering a gang of heel-attaching nails in suitable arrangement or order for driving.

The block B is a pattern-block—that is, it has a pattern or cam face or edge, $b'$, extending entirely about it, and this face or edge determines, in connection with mechanism for rotating the block, hereinafter specified, and the abutment or guide against which the pattern or cam edge bears, the location of each of the holes $b$ in relation to the throat $a^5$, bringing each of the nail-receiving holes $b$ in successive order in line with the throat $a^5$. The rotary movement of the cam-block is intermittent, the movement being such that the block is stopped at the instant each nail-receiving hole registers with the throat. To prevent the nails from leaving the holes $b$ until it is desired to deliver them, I have provided the block with the slide-plate B', which slides in a dovetail recess in the bottom of the block, and which is adapted to be moved to uncover the holes, as hereinafter described, and to permit the delivery of nails from the pattern-block.

The cam or pattern edge $b'$ bears against the guide or abutment C, which preferably has an outward rounded surface, $c$. This abutment has a stem, $c'$, provided with a screw-thread, $c^2$, is supported in the bracket $c^3$, and a nut, $c^4$, adjusts the horizontal position of the guide-edge C. The block B has a central hole, $b^3$, which receives a shaft, $b^4$, the shaft $b^4$ being splined or locked to the block. The shaft extends slightly below the under surface of the block, and also slightly above it sufficient to receive the arms $d\ d'$ of the holder and presser D, and the arm $d$ extending below the block D and the arm $d'$ extending above it, the shaft $b^4$ being free to turn in the holes formed therein. This holder or presser D has a spindle or arm, $d^2$, which is supported in a long hole, $d^3$, formed in the bracket $d^4$. It preferably has a screw-thread, $d^5$, upon which is a nut, $d^6$, against which the spring $d^7$ bears. (See Fig. 6.) I have represented the spring as a coiled spring and as bearing also against one face of the bracket $d^4$. The nut serves to vary the tension upon the spring. The spring acts to hold the pattern or cam face of the block B in contact with the face of the abutment or guide C, so that while the center of the block B may have a variable relation to the face of the abutment the nail-receiving holes $b$ therein are always the same distance from the face of the abutment.

The block B is provided with an interrupted rotation by means of the ratchet-wheel E upon the shaft $b^4$, the pawl $e$, the slide-block $e'$, and the lever $e^2$, which has its fulcrum-pin $e^3$ in the arm $e^4$, which is attached to or integral with the block-holder D. The lever $e^2$ has a cam-pin, $e^5$, which enters the cam-groove $e^6$ in the cam-disk $e^7$. The position of the fulcrum of the lever may be varied to change the extent of movement of the pawl. By making the fulcrum of the lever movable in unison with the movement of the block-holder D the feed-pawl always bears the same relation to the ratchet-wheel E, regardless of the position which the center of the pattern-block B may bear to the gage or abutment C.

There is arranged to bear against the pattern or cam face of the block B a friction-block, F, carried by the holder D and held against the cam or pattern face by a spring, $f$. This immediately checks the momentum of the block upon the end of the forward movement of the feed-pawl.

G is the nail-carrier. It has holes which have the same arrangement or order as the holes $b$ of the distributer-block B, and it also has the perforated hole-covering plate. It is in all respects like the nail-carrier described in Patent No. 290,109, and it has a pin or projection, $g$, which is adapted to come in contact with the front edge of the plate B' and move it sufficiently to cause the holes or perforations therein to register with the holes $b$ and the carrier-holes, when the nails drop from the distributer-block into the carrier G. A spring serves to return the plate B' to a position to close the holes. The distributing-block is of course arranged over the carrier G, and is so timed as to its operation that it is stopped upon the reception of a nail in the last hole to be filled, and also with its holes in line with the holes of the carrier.

The start-and-stop motion devices are similar to those described in said Small application.

The operation of the machine is as follows: The nail making or delivering machine delivers nails in successive order through the throat $a^5$, and the pattern-block B, being rotated, brings each of its holes $b$ in line with the throat in successive order, the movement of the block being stopped sufficiently long to permit the delivery of a nail to each hole.

It is obvious that the form of the cam-face or pattern may be varied to any desired extent to obtain any required arrangement or order of nails; also, that each pattern-block may have one or more extra lines of holes therein, and that such extra line or lines of holes may be brought into register with the throat of the nail-delivering machine for adjustment with the position of the gage C.

The gage C may have an anti-friction roll in lieu of the curved surface $c$. The distributing-block may have also a line of nail-receiving holes of a given number and another line of a larger or smaller number, and by varying the location of the gage C and by removing the ratchet-wheel E and substituting one having the necessary number of teeth and by varying the throw of the feed-pawl the nails can be delivered to the said additional lines of holes whether they have a greater or less number than the other.

It will be seen that on account of the horizontal movement of the block B and support for the lever $e^2$ it is necessary to make the connection between the lever and the cam operating it in a manner to permit the movement of the lever relatively to the cam, and this I accomplish by forming in the lever a long barrel, $m$, cast therewith, in which is formed a long hole for the reception of a long stud, upon the outer end of which a cam-pin, $e^5$, is formed. This stud is horizontally movable in the hole, and a spring, $m'$, bears against the end of the stud or spindle $f'$, which forces the cam-pin outward from the lever $e^2$ and keeps it in its cam-groove regardless of the position of the lever in relation thereto. The spring $m'$ bears at its outer end on the inner surface of the screw-cap $m^2$, which screws upon the barrel $m$ and regulates the tension of the spring. The barrel being long, provides a long substantial bearing for the stud, and is moved, of course, with the lever relatively with the stud, the stud remaining practically stationary so far as said movement is concerned. (See Fig. 7.)

The bracket $d^4$ is bolted to the frame of the machine, and by unscrewing the bolts the bracket-holder D and nail-block B may be removed from the machine. The ratchet may be a regular ratchet or may have its teeth formed of different lengths, according as is desired to move the block B and accordingly the holes $b$ in said block, and to enable the pawl $e$ to act where the teeth are irregular in spacing it is hung to the slide-block, as represented in Fig. 3, and has a spring which bears upon one end to keep it in a given path, while an adjustable screw-stop at the other end limits the action against the spring and tends to hold the operating end of the pawl in any given or desired line of movement.

Having thus fully described my invention, I claim and desire to secure by Letters Patent of the United States—

1. The combination of a nozzle, tube, or block having a throat or passage through which nails are adapted to be fed in successive order, with a distributing-block having a series of nail-receiving holes and a cam or pattern surface, a cam gage, roll, or abutment, and means for intermittingly rotating the block, whereby the nail-receiving holes are brought successively in line with the throat or passage, substantially as described.

2. A nail-distributer comprising a block having a series of nail-receiving holes mounted in a yielding holder and provided with a cam or pattern surface, and a cam roll, gage, or abutment, and means for intermittingly rotating said block, substantially as described.

3. The combination of the nail-distributing block B, having a cam or pattern surface, $b'$, and the nail-receiving holes $b$, with the gage or abutment C and the yielding block-holder D, and devices for imparting intermittent periods of rest and rotation to the block, substantially as described.

4. The combination of the distributing-block B, having the holes $b$ and a cam or pattern surface for governing the relation of the holes to a stationary throat or nozzle as the block is rotated, and a perforated hole covering slide-plate, B', carried by the block, substantially as described.

5. The combination of the block B, having the holes $b$ and the cam or pattern $b'$, the gage C, the holder D, the shaft $b^4$, the ratchet-wheel E, and pawl $e$, and operating-lever carried by an arm, $e^3$, attached to or integral with said holder D, so as to be movable with the block B, as and for the purposes described.

6. The combination of a nozzle, block, or tube having a throat or passage through which nails are adapted to be delivered one by one, with a nail-distributing block having the holes $b$ and movable horizontally, and devices for providing the block with alternate periods of rotation and rest, whereby the holes $b$ are adapted to be brought successively in register with the throat, although not arranged upon a circular line, as and for the purposes described.

7. The combination of a nozzle, tube, or block having a passage through which nails are adapted to be delivered one by one, a nail-distributing block, B, having nail-receiving holes $b$, and a movable hole-covering plate, B', movable in relation to the throat and governed in its horizontal position by a cam, and having intermediate periods of rotation and rest, with a nail-carrier, G, having nail-receiving holes of the same arrangement as the holes of the distributing-block B, as and for the purposes described.

8. The combination of a nozzle, block, or tube having a throat or passage through which nails are adapted to be fed one by one, the distributing-block B, having the holes $b$ and mounted in a yielding holder to be horizontally movable in opposition to a spring, said holder and spring, and an adjustable gage, C, as and for the purposes specified.

9. The combination of the nozzle through which nails are adapted to be fed one by one, the intermittent rotary and horizontally-movable block B, its yielding holder D, a gage, C, and devices for intermittingly rotating the block mounted upon and carried by the holder D, as and for the purposes described.

10. The nail-distributing block B, adapted to have both an intermittent rotary and horizontal movement imparted to it and provided with two or more lines of nail-receiving holes, the adjustable gage or abutment, and a block, nozzle, or tube having a throat through which nails are fed in successive order, as and for the purposes described.

FREEBORN F. RAYMOND, 2D.

Witnesses:
J. M. DOLAN,
E. P. SMALL.